US008406354B2

United States Patent
Khayrallah et al.

(10) Patent No.: US 8,406,354 B2
(45) Date of Patent: Mar. 26, 2013

(54) INTERFERENCE CANCELLATION IN A MULTI-USER RECEIVER

(75) Inventors: Ali S. Khayrallah, Cary, NC (US); Håkan Björkegren, Taby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 821 days.

(21) Appl. No.: 12/495,954

(22) Filed: Jul. 1, 2009

(65) Prior Publication Data

US 2011/0002365 A1    Jan. 6, 2011

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ..................................................... 375/346
(58) Field of Classification Search ............. 375/148, 375/240.01, 260, 262, 264, 265, 267, 295, 375/299, 316, 340, 346, 347
See application file for complete search history.

(56) References Cited

U.S. PATENT DOCUMENTS

| 6,043,765 | A | * | 3/2000 | Twardowski | 341/65 |
| 2003/0066014 | A1 | * | 4/2003 | Van Dijk et al. | 714/774 |
| 2005/0174983 | A1 | * | 8/2005 | Naguleswaran et al. | 370/347 |
| 2007/0140369 | A1 | * | 6/2007 | Limberg | 375/265 |
| 2008/0069262 | A1 | * | 3/2008 | Prasad et al. | 375/267 |
| 2008/0080641 | A1 | * | 4/2008 | Kim | 375/299 |
| 2008/0123719 | A1 | * | 5/2008 | Lee et al. | 375/148 |
| 2008/0282127 | A1 | * | 11/2008 | Mantha et al. | 714/751 |

* cited by examiner

*Primary Examiner* — David C. Payne
*Assistant Examiner* — Syed Haider (57) ABSTRACT

The delay associated with performing interference cancellation in a multi-user receiver is reduced by enabling partial decoding. According to an embodiment, interference is canceled from a received signal having signal contributions from multiple users by partially decoding a first codeword obtained from the received signal and transmitted by a first user via a first signal. The first signal is reconstructed based on the partial decoding of the first codeword and canceled from the received signal to yield a reduced-interference signal. A second codeword obtained from the reduced-interference signal and transmitted by the first user or a second user via a second signal is at least partially decoded. In one embodiment, the first codeword is partially decoded by puncturing one or more coded bits of the first codeword and decoding the first codeword based on the one or more punctured coded bits and estimates of the remaining coded bits.

28 Claims, 10 Drawing Sheets

INTERFERENCE CANCELLATION IN A MULTI-USER RECEIVER

TECHNICAL FIELD

The present invention generally relates to interference cancellation, and more particularly relates interference cancellation in a multi-user receiver.

BACKGROUND

Many types of wireless communication devices receive and process signals transmitted by more than one user. For example, a base station in the WCDMA (Wideband CDMA) uplink receives signals transmitted by multiple users. One or more users may transmit more than one signal. Devices that receive and process signals transmitted by different users are commonly referred to as multi-user receivers because they demodulate and decode a codeword extracted from each of the different signals. Signal transmissions by multiple users often overlap in time and frequency, causing interference at the multi-user receiver.

An optimal multi-user receiver demodulates all signals jointly, at the expense of enormous complexity. Suboptimal multi-user structures such as parallel or serial multi-user receivers are more practical solutions for cancelling multi-user interference in that they can provide suitable interference cancellation for certain applications with much lower complexity. Suboptimal multi-user receivers enhance performance by involving the individual signal decoders in the multi-user receiver. For example, in the WCDMA uplink, multiple users transmit in a somewhat uncoordinated manner. That is, signals arrive at the base station with their slots misaligned, different users may have different spreading factors, etc. Each user individually coordinates with the base station, but without any direct relation to other users.

The base station can boost its performance by cancelling signals it has already processed from the common received signal. Doing so improves the performance of subsequent signals. In a purely illustrative example, two signals may arrive at the multi-user receiver and overlap by T' ms. The span of each signal contains all the samples corresponding to a respective codeword. In the WCDMA uplink, this is referred to as a TTI (transmission time interval). A slot duration is 0.67 ms in WCDMA and a TTI may include 3 slots (2 ms) or 15 slots (10 ms). As such, the spans of the two signals are not necessarily of equal length. The base station can cancel the first signal from the combined received signal to benefit the second signal.

However, the receiver for the first signal must wait until all samples in the corresponding span are received, which ends T−T' ms later than the span of the second signal. After the receiver for the first signal is done with decoding, it then reconstructs the first signal for the purposes of cancellation. Ignoring processing delays for simplicity, the receiver for the second signal must wait at least an additional delay T−T'ms to benefit from the cancellation of the first signal. The delay incurred is related to the length of the codeword associated with the first signal and slows the feedback from the decoder to the cancellation stage. This delay is not acceptable for certain application such as voice. Delay-sensitive applications may prevent otherwise beneficial cancellation from being used. Furthermore, it is difficult to run a stable system where cancellation is turned on and off depending on random relative offsets between signals.

SUMMARY

According to the methods and apparatus disclosed herein, the delay associated with performing interference cancellation in a multi-user receiver is reduced by enabling partial decoding for cancellation. The term 'coded bits' as used herein means the bits produced by an encoder, in contrast to information bits, which are fed to the encoder. In one embodiment, partial decoding is performed by treating unavailable coded bits as erasures, or punctured bits. The unavailable coded bits are carried by modulation symbols that arrive after a certain time threshold, and thus their hard or soft values are not available for decoding. These unavailable bits are treated as effectively punctured bits during the decoding process, by setting the corresponding soft values to zero. Standard decoding techniques for block, convolutional, and turbo codes can all handle punctured bits appropriately. In addition, even if too many bits are absent for the original purpose of decoding information bits accurately, it is still beneficial to use the partial decoding to obtain soft values for the coded bits.

According to an embodiment, interference is canceled from a received signal having signal contributions from multiple users by partially decoding a first codeword obtained from the received signal and transmitted by a first user via a first signal. The first signal is reconstructed based on the partial decoding of the first codeword and canceled from the received signal to yield a reduced-interference signal. A second codeword transmitted by the first user or a second user via a second signal is at least partially decoded from the reduced interference signal.

The demodulator output is in the form of log likelihood ratios (LLR) of the coded bits, or an approximation thereof. A positive (negative) soft value indicates a bit is a 0 (1). A soft value that is equal to zero indicates the demodulator lacks information about the corresponding bit. The missing bit can be treated as an erasure, in the sense that the channel did not carry information about that bit. As such, zero soft values can be used to represent unavailable coded bits. The decoder is capable of processing codewords where certain bits have been punctured at the transmitter, and not sent to the receiver, by setting their soft values to zero. In the same way, the decoder treats unavailable bits as effectively punctured bits, also setting their soft values to zero.

In one embodiment, the first signal is reconstructed by: (a) effectively puncturing the unavailable coded bits of the first signal, e.g. by setting the corresponding soft values to zero; (b) partially decoding the first codeword by processing the available soft values and the effectively punctured zero-value soft values, to produce probabilities of the available and possibly the unavailable coded bits; (c) reconstructing the soft or hard symbols and (d) spreading and filtering the reconstructed symbols to complete the estimate of the first signal.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
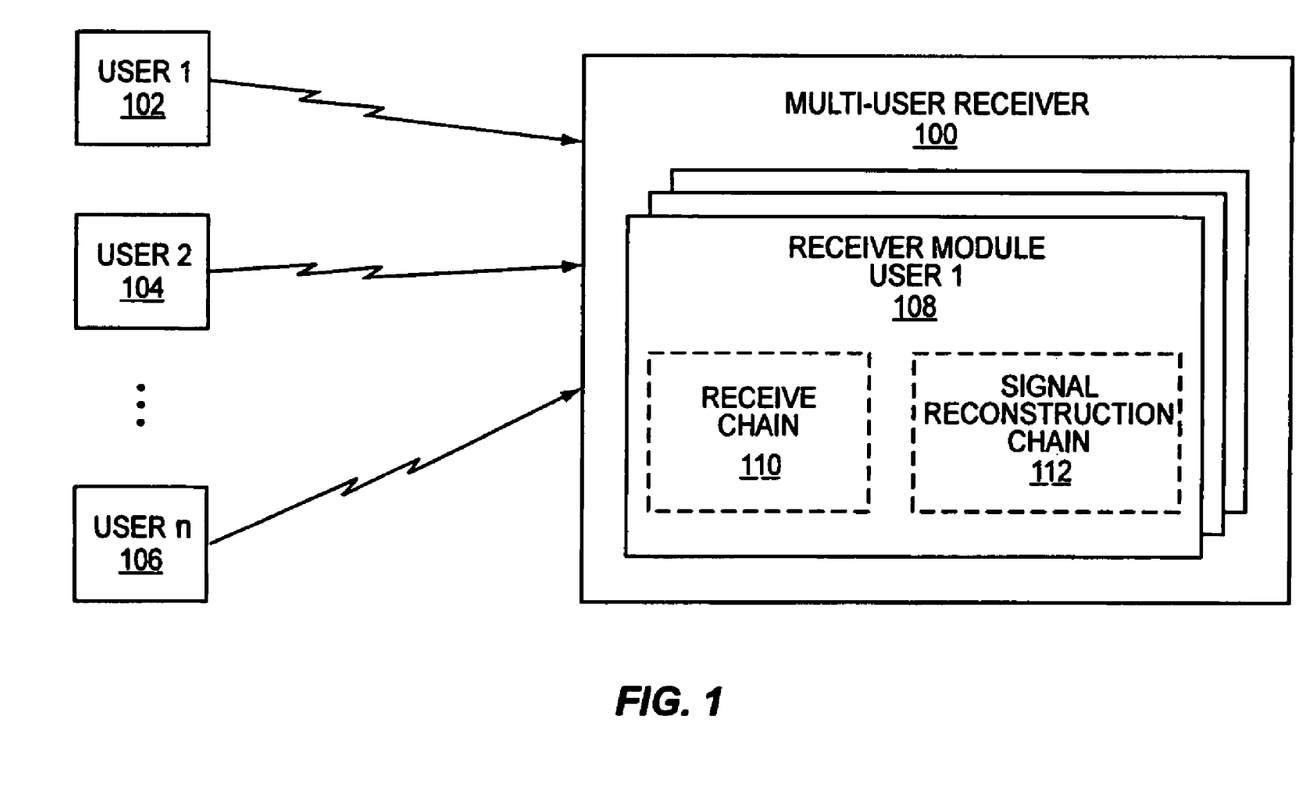
FIG. 1 illustrates a block diagram of an embodiment of a multi-user receiver.

FIG. 1 illustrates an embodiment of a multi-user receiver 100 for cancelling interference from a received signal having signal contributions from multiple users 102, 104, 106. Each signal is transmitted by a different user 102, 104, 106 and includes a codeword. The codeword represents information bits encoded by the corresponding user. Each codeword is interleaved, modulated into one or more symbols, spread onto chips and filtered, and transmitted to the multi-user receiver 100 over a channel allocated to the user. Other standard transmitter functions such as frequency shifting and amplification, and similar receiver functions, which are not of direct relevance to the present invention, are not discussed herein. In one embodiment, the multi-user receiver 100 is a base station in the WCDMA uplink. According to this embodiment, multiple users 102, 104, 106 transmit signals to the base station in a somewhat uncoordinated manner and the base station cancels interference caused by overlapping signal contributions. The multi-user receiver 100 can be any type of receiver in the uplink or the downlink of WCDMA and cancel any type of multi-user interference, including other cell interference. The multi-user receiver 100 can operate with other air interfaces such as OFDM (orthogonal frequency division multiplexing) or TDMA (time division multiple access).

In more detail, the multi-user receiver 100 cancels signal interference by partially decoding a first codeword obtained from a common received signal. The partially decoded codeword is transmitted by a first user 102 via a first signal and at least partially overlaps with a codeword transmitted by the same user 102 or one or more other users 104, 106 via a different signal. The multi-user receiver 100 reconstructs the first signal based on the partial decoding of the first codeword and cancels the reconstructed first signal from the received signal to yield a reduced-interference signal. The multi-user receiver 100 at least partially decodes a second codeword obtained from the reduced-interference signal and transmitted via a second signal. Thus, the multi-user receiver 100 can decode the second codeword without significant interference from the first code even though the entire first codeword has not been received and fully decoded.

The multi-user receiver 100 includes a receiver module 108 allocated to each one of the users 102, 104, 106 for processing signals transmitted by the corresponding user. The receiver modules 108 can be implemented in hardware, e.g. as an ASIC (application-specific integrated circuit), software, e.g. as a DSP or a combination of hardware and software, e.g. partly as an ASIC and partly as a DSP. Each of the receiver modules 108 includes a receive chain 110 and a signal reconstruction chain 112. The receive chain 110 enables the corresponding receiver module 108 to demodulate, de-interleave and decode a signal transmitted by the assigned user, the transmitted signal including samples corresponding to a respective codeword. The codeword includes coded bits corresponding to information bits encoded by the user. Coded bits are also commonly referred to as modem bits, the terms being used herein interchangeably unless otherwise noted. Signals transmitted by the users 102, 104, 106 may have different length codewords. For example, in the WCDMA uplink, the span of each signal is a TTI which may include 3 slots or 15 slots. In addition, signals transmitted by two or more users 102, 104, 106 may arrive at the multi-user receiver 100 at different times. As such, signals arriving at the multi-user receiver 100 overlap in time. The receiver modules 108 account for the overlapping nature of the received signals when the signal reconstruction chain 112 reconstructs the signals for interference cancellation.

Figure 2:
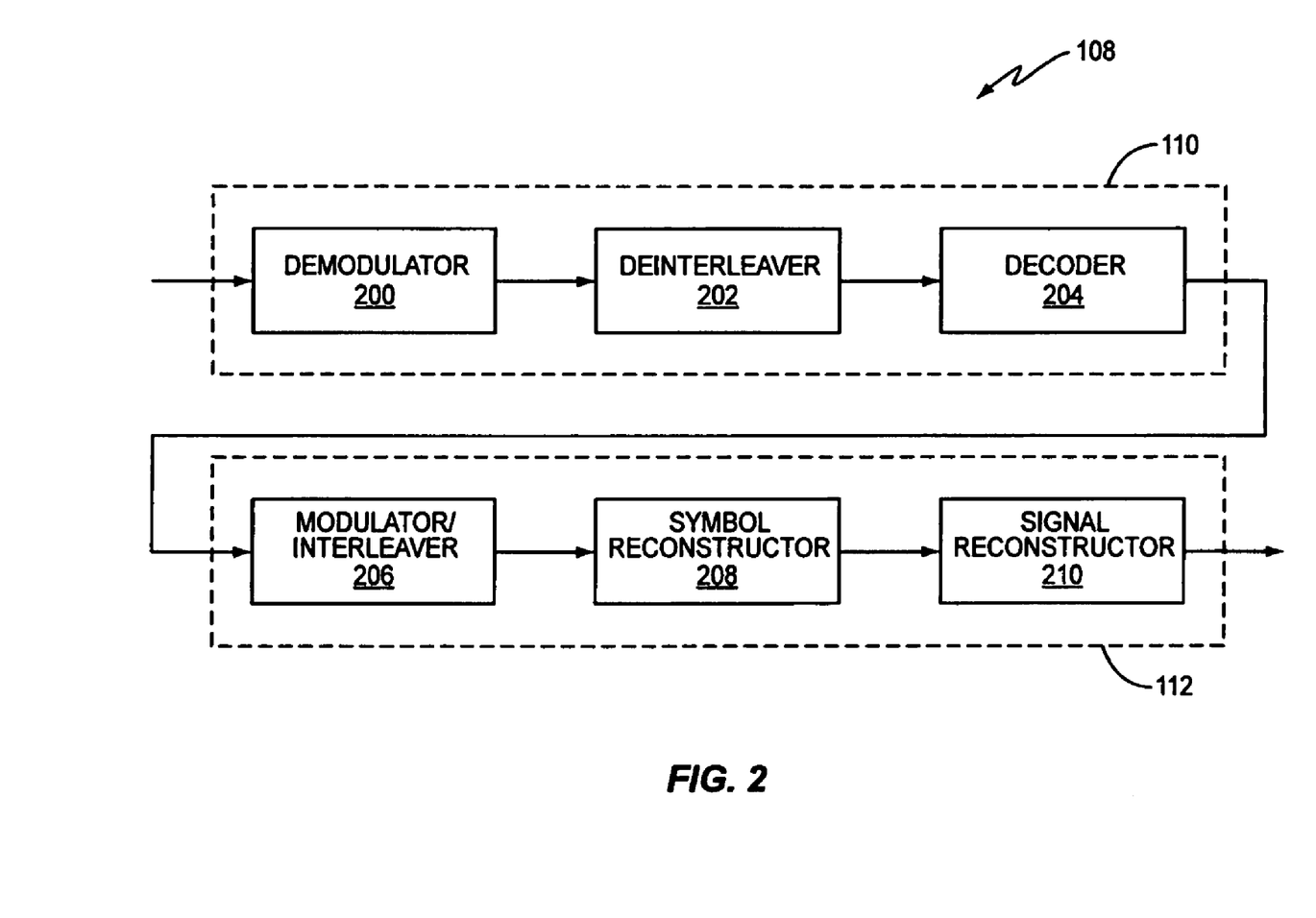
FIG. 2 illustrates a block diagram of an embodiment of a receiver module included in the multi-user receiver of FIG. 1.

FIG. 2 illustrates an embodiment of the receiver modules 108 of the multi-user receiver 100. Each receiver module 108 includes the receive chain 110 and the signal reconstruction chain 112. The receive chain 110 includes a demodulator 200, de-interleaver 202, and decoder 204. In one embodiment, the demodulator 200 is a GRAKE (generalized RAKE) demodulator. A GRAKE demodulator is a symbol-by-symbol linear demodulator which treats all sources of noise and interference as a single colored noise, modeled by a covariance matrix. Another type of demodulator can be used in place of the GRAKE such as a RAKE receiver, which can be viewed as a special case of GRAKE where noise and interference are treated as white noise. The demodulator 200 can also be a linear chip equalizer or a more complex nonlinear demodulator such as a DFE (decision-feedback equalization), MLSE (maximum likelihood sequence estimation), or DFSE (Decision Feedback Sequence Estimator) modulator.

The receiver 100 may include multiple antennas (not shown). Each antenna can be connected to a complete receive chain 110, producing baseband samples. The samples from all antennas are fed to the demodulator 200. For the GRAKE embodiment, the processing is the same regardless of the number of antennas. That is, a covariance matrix entry reflects the short term second order statistics of two samples, which may belong to the same antenna or different antennas. The output of the demodulator 200 is coded bit soft values in LLR form, or a similar form, as discussed earlier. Regardless, the de-interleaver 202 operates on the soft values, and undoes the interleaving performed prior to signal transmission. The decoder 204 outputs hard or soft values for the coded bits. The signal reconstruction chain 112 of the receiver module 108 includes a modulator/interleaver 206, symbol re-constructor 208 and signal re-constructor 210 for re-modulating received signals.

Figure 3:
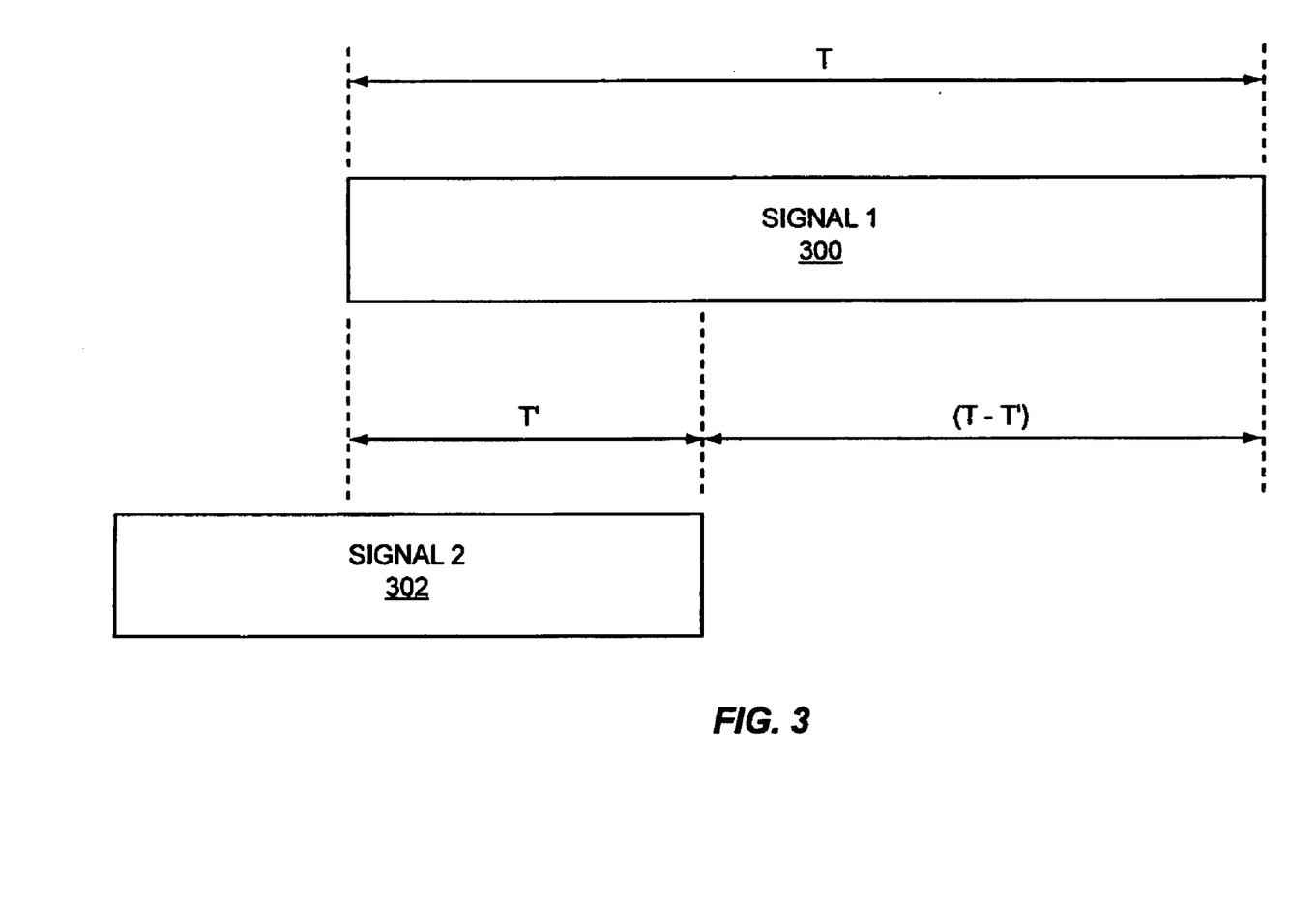
FIG. 3 illustrates a signal transmission diagram of overlapping signals processed by the multi-user receiver of FIG. 1.

Operation of the multi-user receiver 100 and the receiver modules 108 is described next with reference to FIG. 3 which illustrates two signals 300, 302 transmitted by different users that arrive at the receiver 100 at different times. While FIG. 3 illustrates two transmitted signals, the embodiments described herein readily extend to any number of transmitted signals. The first signal 300 is transmitted by one of the users 102, 104, 106 and includes a codeword having a length spanning T ms. The second signal 302 is transmitted by the same user or a different one of the users 102, 104, 106 and includes a codeword, which may be of a different length, and in this example it is shorter than the first codeword and which arrives before the first codeword. In addition, the first and second signals 300, 302 overlap by T' ms and all samples of the first signal 300 are not received until T−T' ms after the end of the second signal 302. The receiver module 108 assigned to the first user 102 does not wait until all samples of the first signal 300 are received and demodulated to decode the first signal. Instead, the corresponding decoder 200 partially decodes the codeword of the first signal 300. In one embodiment, partial decoding is performed by treating later arriving coded bits of the codeword carried by modulation symbols received after a particular point in time as erasures, or effectively punctured bits. This means that their unavailable soft values are replaced with zero values.

By treating the later arriving coded bits of the first signal 300 as effectively punctured bits, the decoder 200 assigned to the first signal 300 can decode the codeword even though some of the coded bits are not yet received and demodulated. This is referred to herein as 'partial decoding'. The signal reconstruction chain 112 assigned to the first signal 300 uses the partial decoding results to reconstruct the transmitted signal and cancel the reconstructed signal from the common received signal. Doing so reduces the interference caused by the first signal 300, enabling the receiver module 108 associated with the second signal 302 to demodulate and decode the second signal 302 absent significant interference from the first signal 300 without having to wait for the entire codeword of the first signal 300 to be received, demodulated and decoded. This is particularly advantageous for time-sensitive applications such as voice where long delays are intolerable.

Figure 4:
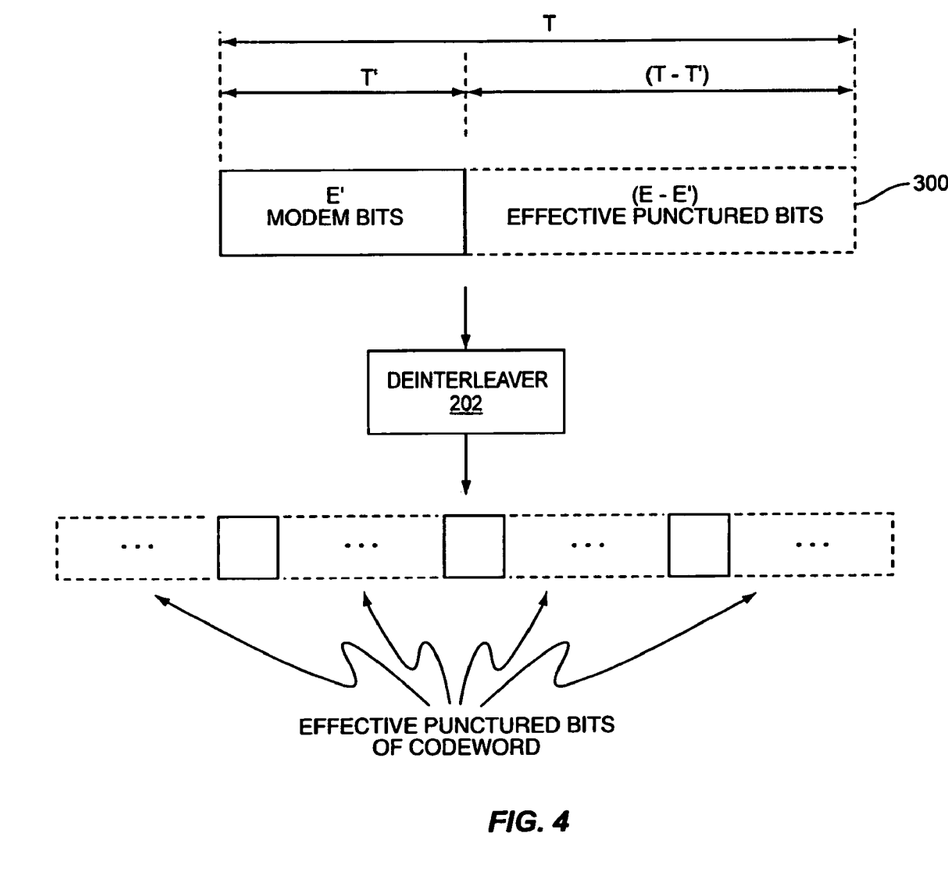
FIG. 4 illustrates a diagram of a bit puncturing technique employed by the multi-user receiver of FIG. 1.

With reference to the exemplary signal transmission embodiment of FIG. 3, T' ms of the total span T of the first signal 300 overlaps the second signal 302. In some embodiments, the multi-user receiver 100 attempts to avoid all delay by ignoring the part (T−T') of the first signal 300 that does not overlap the second signal 302. Let E denote the number of coded bits mapped into the symbols spread over the span T. Also let E' denote the number of coded bits mapped into the symbols spread over part T'. By ignoring the non-overlapping part of the first signal 300 (T−T'), the E−E' coded bits of the first signal 300 are effectively punctured, i.e. their soft values are set to zero as shown in FIG. 4. The missing coded bits that are punctured are treated as zeroes at the input to the corresponding de-interleaver 202, indicating the absence of information about the missing bits. After de-interleaving, the punctured bits are distributed throughout the codeword as shown in FIG. 4. It is the coded bits of the codeword which are decoded for use in interference cancellation, not decoded information bits.

In other embodiments, the time span T' can be chosen to exceed the end of the second signal 302, constrained by the acceptable delay in processing the second signal 302. That is, a larger T' allows more information to reach the receiver module 108 associated with the first signal 300. This enables the signal reconstruction chain 112 associated with the first signal 300 to yield a better reconstruction of the first signal 300, benefiting the decoding of the second signal 302. In yet other embodiments, the time span T' can be chosen to be less than the end of the second signal 302, e.g. if the delay requirement of the second signal 302 is very strict and processing time must be accounted for. In each embodiment, decoding of the first signal 300 is performed using less than all of the coded bits of the signal 300 by treating the missing or later-arriving bits as punctured. This enables the multi-user receiver 100 to reconstruct the first signal 300 and cancel the reconstructed signal from the common received signal without having to wait for all of the coded bits of the first signal 300 to arrive at the receiver 100.

Decoders are well-equipped to handle punctured bits. Bit puncturing is typically initiated at a transmitter and undone at the receiver to provide design flexibility. An example of bit puncturing is described next with reference to a punctured convolutional code. A punctured convolutional code is derived from a mother code which has no puncturing. The mother code has a nominal encoding rate 1/A and memory D. There are B information bits to be encoded. Without much loss of generality, encoding can be assumed to start and end in state 0. The B information bits are appended with D tail bits, all set to 0. The encoder for the mother code accepts a single information bit at a time and produces A modem bits at a time, for a total of A(B+D) bits. Of those, E modem bits are actually produced. The remaining A(B+D)−E bits are punctured according to a puncturing table. The true rate of the punctured code is B/E. Without puncturing, the true rate is B/(A(B+D)). At the receiver, the demodulator produces E soft values for the modem bits. They are de-interleaved and accepted by the decoder. The decoder first inserts A(B+D)−E zeros at the appropriate locations to represent the bits punctured at the encoder. A zero value indicates the absence of knowledge about a punctured bit. From that point on, the decoder for the punctured code is that of the mother code. No further special treatment for the punctured bits is needed, as they are reflected properly through the zero values in the decoder metric. The state space of the convolutional code is constant throughout the codeword, with special allowance for termination. The state space is of size $2^D$. The decoder operates over a trellis, which describes the progression through the state space over the codeword length.

In conventional systems, decoder operation is focused on recovering the original information bits. Here, the decoders 204 of the receiver modules 108 focus on the coded bits. As such, each decoding stage represents an A-tuple of coded bits of the mother code. When bits are punctured by the user encoder, the corresponding indices at the decoder 204 are assigned soft value 0. For convenience, the soft values can be transformed into probabilities, as in equation (10) below. In particular, for zero soft values, the probability of a 0 or 1 is 1/2. The trellis has (B+D) stages. At each stage of the trellis, there are branches connecting starting states to ending states. A branch is interchangeable with the pair (c',c) of its starting and ending states, respectively. Each branch (c',c) has a label, which consist of an A-tuple of coded bits of the mother code. At stage k, for each state pair (c',c), a probability $\gamma_k(c',c)$ is computed from the A-tuple and the coded bit probabilities. For pairs (c',c) without branches, $\gamma_k(c',c)=0$.

In one embodiment, the decoder 204 of the receiver modules 108 can be MAP (maximum a posteriori) decoders including forward recursion, backward recursion, and combining stages. Such a MAP decoder can be used for convolutional codes. Alternatively, the MAP decoder can be used for turbo codes whose component codes are convolutional codes. The MAP decoder may also be used for block codes, where the state space varies over the codeword length. Regardless, the forward recursion is given by:

$$\alpha_k(c) = \sum_{c'} \alpha_{k-1}(c') \cdot \gamma_k(c', c) \qquad (1)$$

The backward recursion is given by:

$$\beta_{k-1}(c') = \sum_{c} \beta_k(c) \cdot \gamma_k(c', c) \qquad (2)$$

The initial conditions are given by:

$$\alpha_0(0)=1, \text{ and } \alpha_0(c)=0, c \neq 0 \qquad (3)$$

$$\beta_{B+D}(0)=1, \text{ and } \beta_{B+D}(c)=0, c \neq 0 \qquad (4)$$

Suppose the i-th bit at stage k corresponds to coded bit $y^{(1)}(j)$ where the superscript[(1)] indicates the first signal. If the i-th bit at stage k corresponds to a punctured bit, the combining step is skipped. The set $\Omega_0$ ($\Omega_1$) contains the branches (c',c) at stage k whose i-th bit label is equal to 0 (1). The following values are computed:

$$v_0 = \sum_{(c',c) \in \Omega_0} \alpha_{k-1}(c') \cdot \gamma_k(c',c) \cdot \beta_k(c) \quad (5)$$

and $$v_1 = \sum_{(c',c) \in \Omega_1} \alpha_{k-1}(c') \cdot \gamma_k(c',c) \cdot \beta_k(c) \quad (6)$$

The coded bit probabilities are then given by:

$$P(y^{(1)}(j) = 0) = \frac{v_0}{v_0 + v_1} \quad (7)$$

$$P(y^{(1)}(j) = 1) = \frac{v_1}{v_0 + v_1} \quad (8)$$

The respective decoder 204 is capable of producing hard and soft values about the coded bits, in addition to the information bits which are not of direct relevance for the interference cancellation embodiments disclosed herein. In one embodiment, the coded bit soft values are in LLR form denoted as $\lambda$, or an approximation thereof. The terms 'LLR' and 'coded bit probability' are used interchangeably herein and mean the same thing unless otherwise noted. The probability of a coded bit being a 0 is denoted $\pi$. The LLR is given by:

$$\lambda = \ln\left(\frac{\pi}{1-\pi}\right) \quad (9)$$

The coded bit probability can be expressed as:

$$\pi = \frac{e^\lambda}{1+e^\lambda} \quad (10)$$

That is, a positive $\lambda$ indicates a 0. A hard bit decision can be obtained by taking the sign of $\lambda$. For example, a hard decision of +1 indicates a 0, and $\pi=1$. The signal reconstruction chain 112 assigned to the first user 102 reconstructs the first signal 300 based on the partial decoding results.

Figure 5:
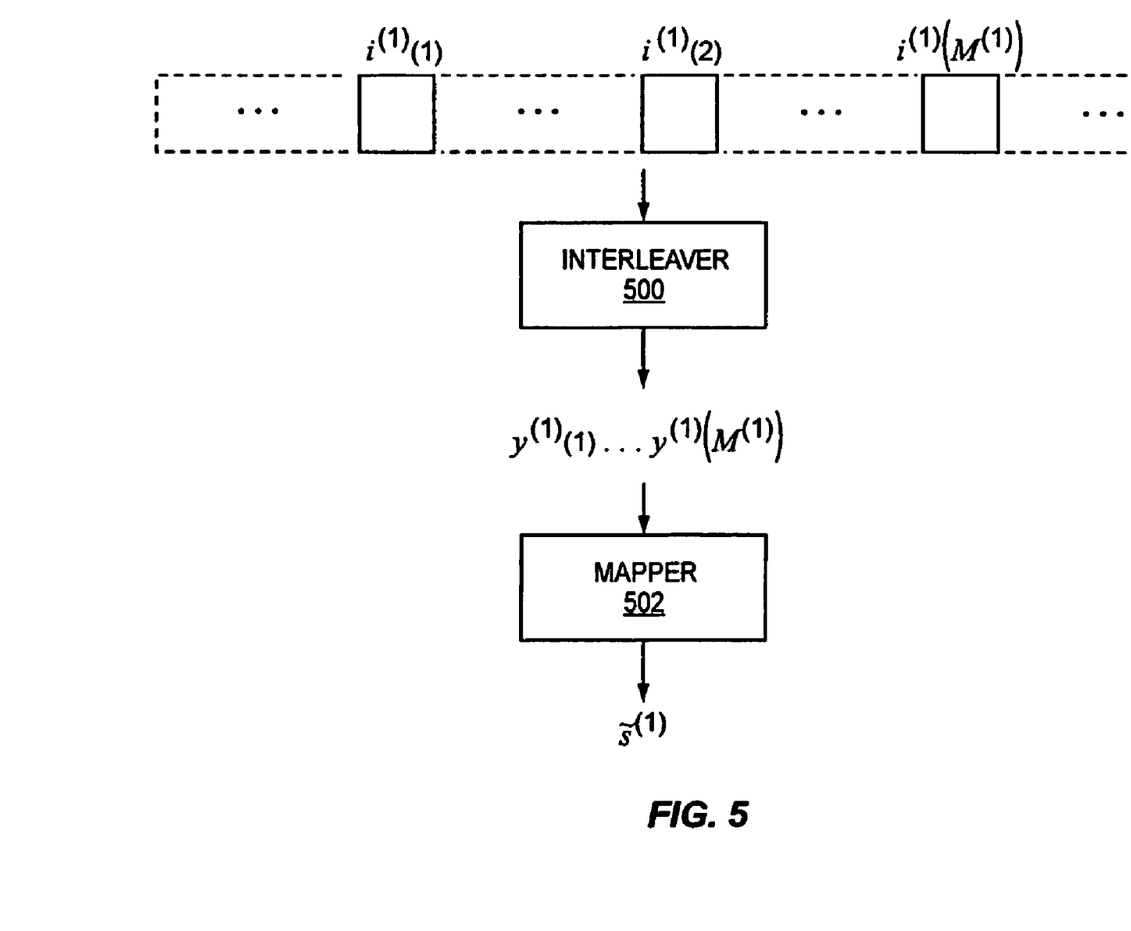
FIG. 5 illustrates a diagram of a symbol reconstruction technique employed by the multi-user receiver of FIG. 1.

FIG. 5 illustrates an embodiment of the modulator/interleaver and symbol re-constructor components 206, 208 of the signal reconstruction chain 112. The first signal 300 uses a modulation of size $2^{M^{(1)}}$ and a spreading factor $F^{(1)}$. The over-sampling rate N is the same for both signals in this example. The channel allocated to the first user 102 has dispersion of length $D^{(1)}$ samples, and is represented by a vector $h^{(1)}$ of channel taps where the superscript[(1)] indicates the first signal 300. When the receiver 100 has multiple antennas, each antenna experiences a different channel. Then the delay $D^{(1)}$ reflects the maximum dispersion among the multiple channels. Also, the channel tap vector $h^{(1)}$ reflects the multiple channels. Referring to FIG. 5, the codeword includes de-interleaved coded bits $i^{(1)}(j)$ output by the corresponding decoder 204. An interleaver 500 arranges the coded bits as was initially done by the first user 102. The resulting $M^{(1)}$ coded bits $y^{(1)}(j)$, for $j=1, \ldots, M^{(1)}$ are mapped by a symbol mapper 502 into a modulation symbol $s^{(1)}$ of the first signal 300 where $I^{(1)}(j)$ denotes the location of $y^{(1)}(j)$ in the codeword before interleaving by the interleaver 500. The soft values for the coded bits are denoted $\lambda^{(1)}(j)$ and the corresponding coded bit probabilities are denoted $P(y^{(1)}(j))$.

Given the coded bit probabilities, the signal reconstruction chain 112 assigned to the first user 102 can reconstruct the soft symbol for $s^{(1)}$. Particularly, the symbol re-constructor 208 forms a distribution on the constellation, using the mapping from coded bits to symbol. That is, for each point $\sigma$ on the constellation, the product of the probabilities of the corresponding $M^{(1)}$ modem bits is assigned. As a result, a symbol probability $P(s^{(1)})$ is generated. The symbol re-constructor 208 also computes a soft symbol value as the expected value of $s^{(1)}$, denoted $\tilde{s}^{(1)}$, given by:

$$\tilde{s}^{(1)} = \sum_\sigma \sigma P(s^{(1)} = \sigma) \quad (11)$$

In case of hard decisions on the coded bits, all except one symbol value $\sigma_0$ has probability 0, and $\tilde{s}^{(1)}$ will be equal to $\sigma_0$. If the probability distribution for one or more of the $M^{(1)}$ coded bits mapping into $s^{(1)}$ is unavailable, then it is replaced by the uniform distribution (1/2,1/2). In the degenerate case where no coded bit probability is available, then the distribution of $s^{(1)}$ also becomes uniform $(2^{-M^{(1)}}, \ldots, 2^{-M^{(1)}})$.

The signal re-constructor 210 multiples the soft symbol $\tilde{s}^{(1)}$ by the appropriate spreading sequence of $F^{(1)}$ chips, denoted by a vector $q^{(1)}$, to produce a vector $t^{(1)}$ given by:

$$t^{(1)} = \tilde{s}^{(1)} \times q^{(1)} \quad (12)$$

The reconstructed first signal $u^{(1)}$ of length $F^{(1)}N+D^{(1)}$ is then given by:

$$u^{(1)} = h^{(1)} * t^{(1)} \quad (13)$$

where * indicates convolution.

Figure 6:
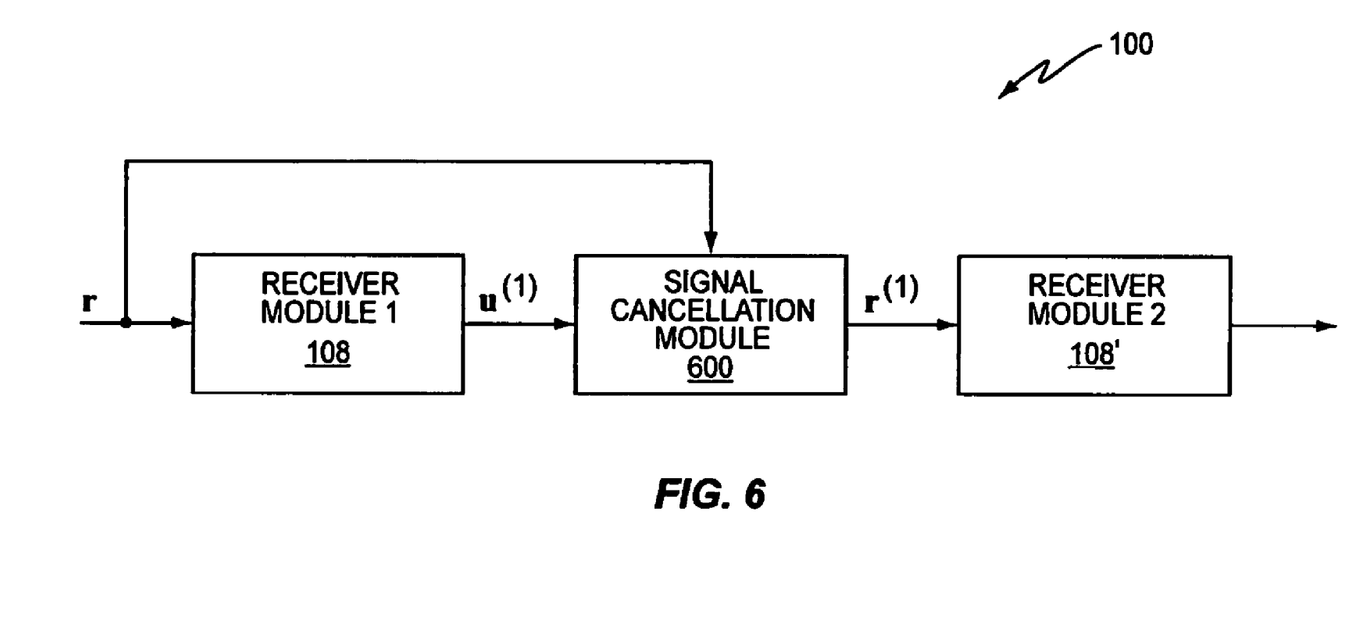
FIG. 6 illustrates a block diagram of an embodiment of a signal cancellation module included in the multi-user receiver of FIG. 1.

FIG. 6 illustrates an embodiment of the receiver modules 108 assigned to the first and second users 102, 104 along with a signal cancellation module 600. The signal cancellation module 600 cancels the reconstructed first signal $u^{(1)}$ from the common received signal r to yield a reduced-interference signal $r^{(1)}$ as given by:

$$r^{(1)} = r - u^{(1)} \quad (14)$$

The reduced-interference signal $r^{(1)}$ is relatively free from interference from the first signal 300 even though the first signal 300 was not fully decoded. The same over-sampling N can be used by the receiver module 108' assigned to the second user 104 for demodulating the second signal 302 when the users 102, 104 employ the same over-sampling rate. The second signal 302 uses a modulation of size $2^{M^{(2)}}$ and a spreading factor $F^{(2)}$ where the superscript[(2)] indicates the second signal 302. The channel allocated to the second user 302 has dispersion of length $D^{(2)}$ samples, and is represented by a vector $h^{(2)}$ of channel taps.

Figure 7:
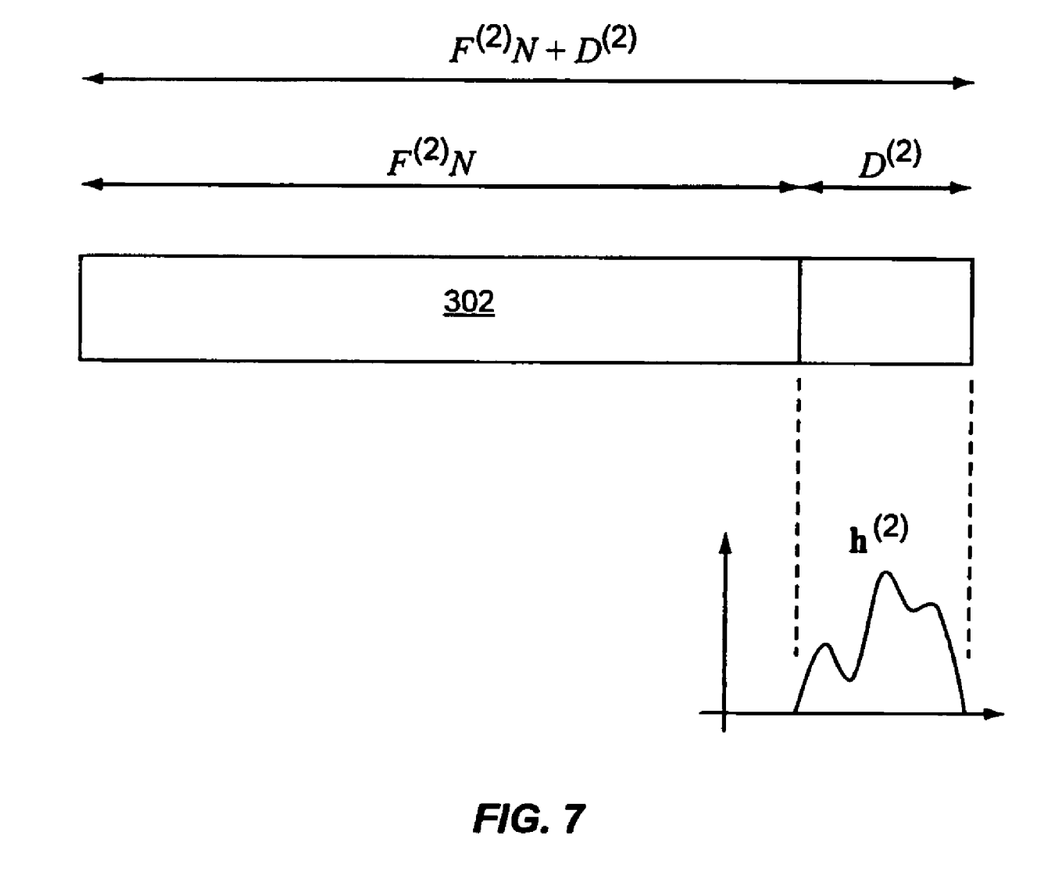
FIG. 7 illustrates a signal transmission diagram of a signal processed by the multi-user receiver of FIG. 1.

FIG. 7 illustrates an embodiment of winnowing scheme of proper size for ensuring the channel represented by vector $h^{(2)}$ is fully covered. A symbol-by-symbol demodulator such as a GRAKE demodulator requires a window of data size $F^{(2)}N+D^{(2)}$ samples to fully cover $h^{(2)}$ of the second signal 302.

Figure 8:
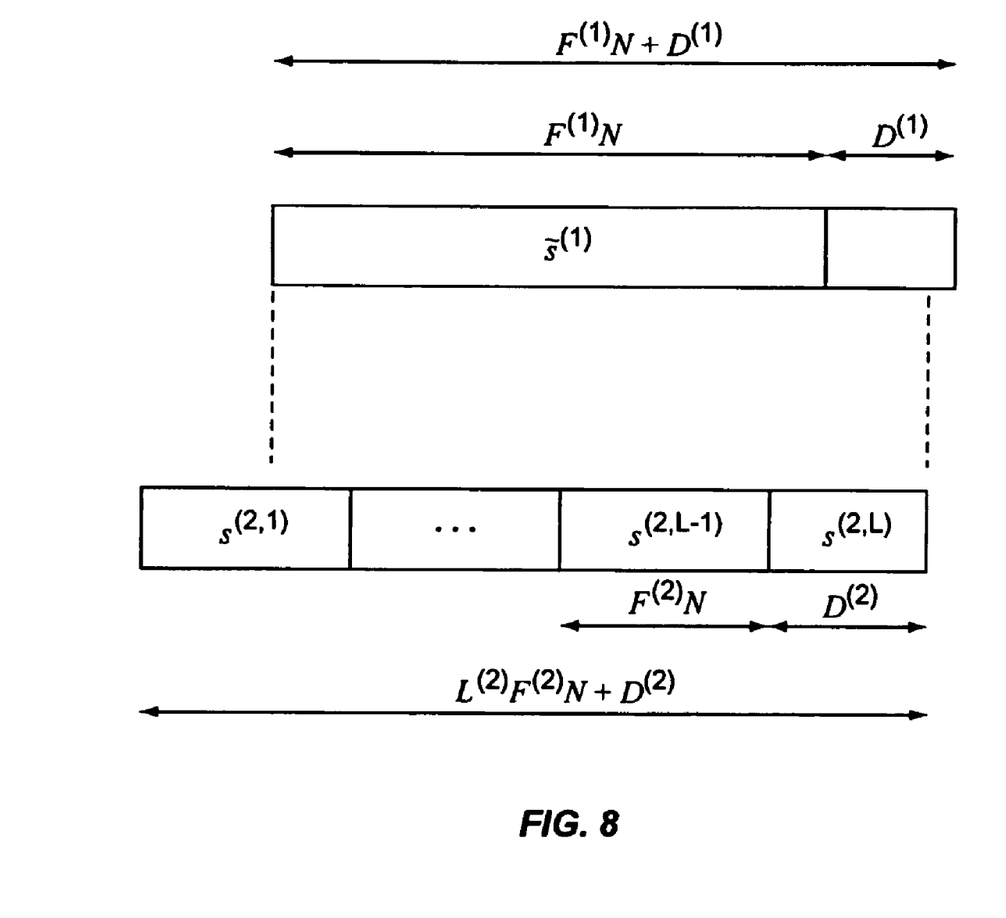
FIG. 8 illustrates a reconstructed interfering symbol overlapping symbols of another signal processed by the multi-user receiver of FIG. 1.

FIG. 8 illustrates a signal transmission embodiment where $F^{(1)} > F^{(2)}$ and the $F^{(1)}N+D^{(1)}$ span of $r^{(1)}$ covers $L^{(2)}F^{(2)}N+D^{(2)}$ samples corresponding to $L^{(2)}$ symbols of the second user 104. In the absence of cancellation, the effect of $s^{(1)}$ would be present in the common received signal r, through the signal approximated by $u^{(1)}$, which would interfere with the reception of the second signal 302. This interference would be accounted for in the covariance matrix R of a GRAKE demodulator for the second signal 302. With the cancellation of $u^{(1)}$ in $r^{(1)}$, e.g. as given by equation (14), the reception of the $L^{(2)}$ symbols of the second user 104 improves. In a GRAKE embodiment, the GRAKE assigned to the second signal 302 computes a covariance matrix R', which reflects the absence of interference from the first signal 300. In that sense, the GRAKE demodulator can re-allocate its resources to cancel other interference. In FIG. 8, the left-most symbol $s^{(2,1)}$ of the second signal 302 is partly covered by the span of the reconstructed symbol $\tilde{s}^{(1)}$ of the first signal 300. Accordingly, the uncovered samples of the left-most symbol $s^{(2,1)}$ are not affected by the original symbol $s^{(1)}$ in this example. Of course, the samples may be affected by another symbol of the first signal 300, or by symbol(s) of other signal(s).

As explained previously herein, effectively punctured coded bits (i.e. later-arriving bits) are processed the same way as the true punctured bits. Referring back to FIG. 4, the corresponding demodulator 200 produces E' soft values, reflecting the partial reception of the first signal 300. The missing (E–E') soft values are effective punctured bits, and they are represented with zeros. The total E soft values are fed to the corresponding de-interleaver 202 as previously described herein. No further special treatment of the effective punctured bits is needed. Also as described above, The E de-interleaved soft values are augmented with A(B+D)–E zeros at the appropriate locations to represent the bits originally punctured at the encoder of the first user 102. The total A(B+D) soft values are fed to the corresponding decoder 204 of the mother code. Even if coded bit $y^{(1)}(j)$ is effectively punctured, the decoder 204 still produces useful information about the later-arriving bit. As such, symbols not actually received can still be reconstructed. In turn, the span for the reconstructed signal can exceed the received span. The partial decoding embodiments described herein can be readily extended to more than two signals.

Figure 9:
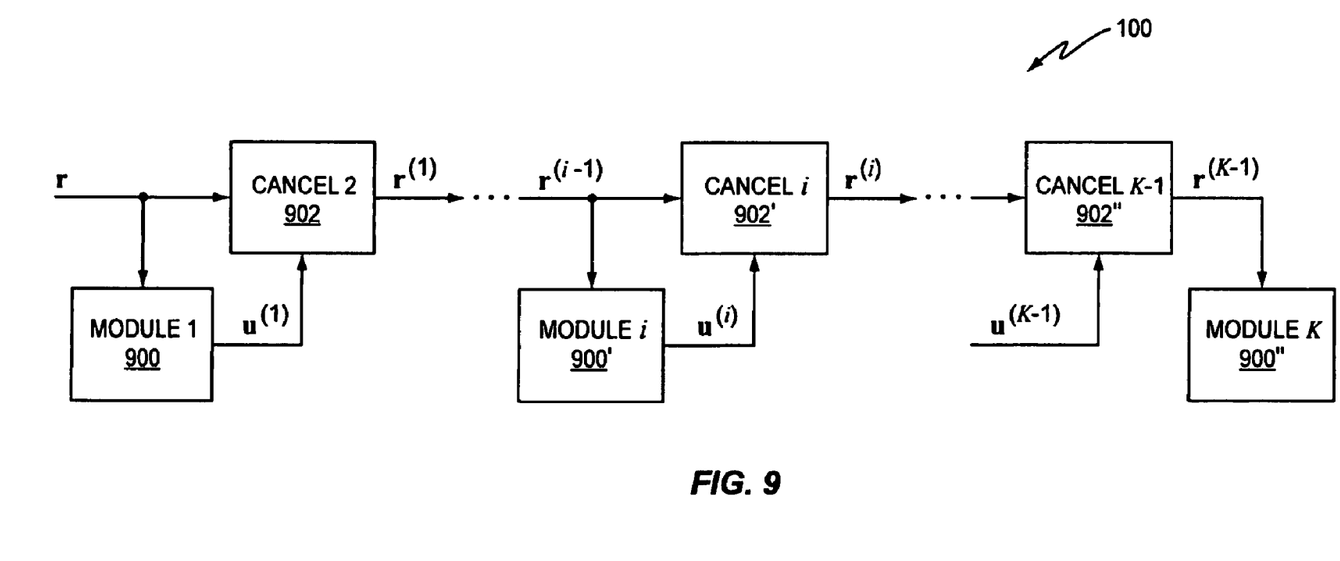
FIG. 9 illustrates a block diagram of an embodiment of a serial interference cancellation multi-user receiver.

FIG. 9 illustrates an embodiment of the multi-user receiver 100 implemented as a serial interference cancellation (SIC) structure with K signals. In some embodiments, larger signals can be processed early and smaller signals processed later. Similar to the receiver module 108 of FIG. 1, the ith receiver module 900' has a receive chain and a signal reconstruction chain for signal i. The modified received signal $r^{(i-1)}$ generated by the previous receiver module has been obtained from the common received signal r by subtracting the previous i–1 reconstructed signals. In one embodiment, a demodulator of the ith receiver module 900' is a GRAKE demodulator. The corresponding covariance matrix reflects the interference left in the modified received signal r Similar to the signal cancellation module 600 for signal 1 in FIG. 6, the ith cancellation block 902' removes reconstructed signal $u^{(i)}$ from $r^{(i-1)}$ to produce $r^{(i)}$, which helps reduce signal interference for the subsequent receiver modules. The issue of overlap time becomes more challenging in SIC environments where several signals are received and processed.

Figure 10:
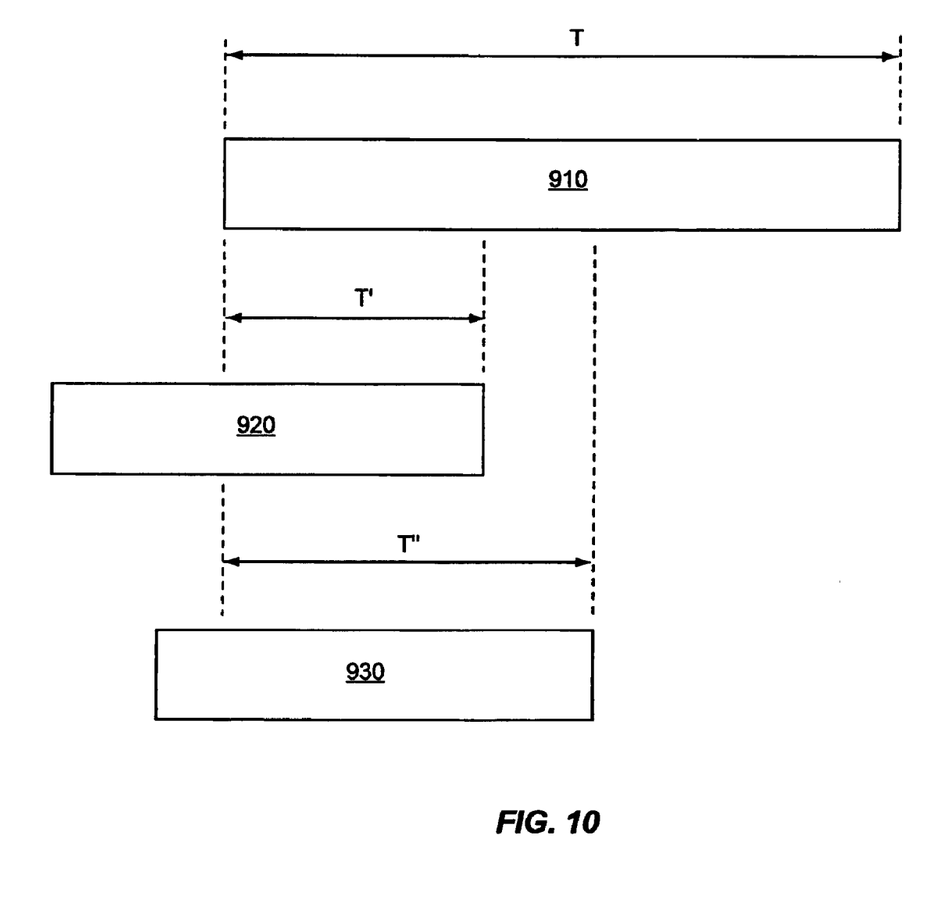
FIG. 10 illustrates a signal transmission diagram of overlapping signals processed by the serial interference cancellation multi-user receiver of FIG. 9.

FIG. 10 illustrates an embodiment of three signals 910, 920, 930 processed sequentially by the SIC structure. The overlap time of the first signal 910 to cover the second and third signals 920, 930 is T". In one embodiment, the first signal 910 is partially decoded as previously described herein over time T" in the first receiver module 900. As a result, the reconstructed signal $u^{(1)}$ covers T", and first benefits the second receiver module 900' via the modified received signal $r^{(1)}$, and then benefits the third receiver module 900" via the modified received signal $r^{(2)}$. In another embodiment, the signals 910, 920, 930 are progressively reconstructed. That is, an early signal in the SIC structure may be reconstructed over increasingly longer overlap times to benefit later signals in the structure. For example, the overlap time of the first signal 910 to benefit the second signal 920 is T'<T". Thus, it is possible to do a partial decoding and reconstruction in the first receiver module 900 over time T' to benefit the second signal 920. Then, the first receiver module 900 is revisited for a second partial decoding and reconstruction over time T" to benefit the third signal 930.

Varying the overlap time has an impact on the processing in the second iteration of the first receiver module 900. In one embodiment, the first receiver module 900 performs demodulation over the extra time (T"–T'). Decoding is then begun anew using the coded bits from T' and from (T"–T'). The signal reconstruction process performed by the first module 900 is also started anew to produce a new reconstructed signal $u^{(1)}$ to cover T". In another embodiment, the signal is reconstructed only over the extra time (T"–T') and concatenated with the old reconstructed signal over T' to produce a new $u^{(1)}$. In yet another embodiment, the decoding state is taken based on the coded bits over T' as a starting point, and adding the coded bits over (T"–T') as new side information. Decoding can then be performed again as a second iteration, for instance using a turbo decoding approach.

In one embodiment, larger signals are processed earlier in the SIC structure. In other embodiments, it may be more beneficial to consider signal overlap and delay in the decision to order the signals given the impact of delay. For instance, the power estimate of a signal, used in ranking the signals for processing in the SIC structure, can be adjusted based on its overlap with other signals, since the signal interacts with the other signals in the overlap region. Accordingly, a large signal with a small overlap may get pushed later in the SIC structure.

A second consideration is the coding rate, given its impact on partial decoding. A signal with a low coding rate can withstand a more extreme partial decoding, so it may get pushed earlier in the SIC structure. Furthermore, the coding rate can be adjusted to reflect the overlap, by accounting for effectively punctured bits.

Various signal quality metrics are available to the multi-user receiver 100 for deciding whether a sufficient number of bits are available to begin partial decoding and whether signal reconstruction and cancellation benefits other signal(s). SNR (signal-to-noise ratio), symbol metrics and coded bit LLR values each can be used to make partial decoding and signal reconstruction decisions. SNR comes from the parameter estimation process, which precedes the demodulator 200 of the receiver module 108. Symbol metrics come from the demodulator 200, which precedes the decoder 204. The modem bit LLR's come from the decoder 204, which precedes any CRC (cyclic redundancy code) check which may be performed.

SNR is the byproduct of the parameter estimation process, and is typically available for providing feedback of channel quality information (CQI) to the remote transmitter. The demodulator 200 may also produce metrics as a byproduct of its operation. In one embodiment, the metrics include the Euclidean distance between the decided symbol and the received value. If coded bit soft values are available, e.g. in the form of the LLR's $\lambda^{(1)}(j)$ as described previously herein, another signal quality metric can be derived as given by:

$$\lambda_{min} = \min_j |\lambda^{(1)}(j)| \qquad (15)$$

This signal quality metric reflects the least reliable coded bit. Other signal quality metrics may also be derived from the LLR's, e.g. rank information such as the $10^{th}$ percentile value, or other percentile values. Yet other quality metrics may be derived from the LLR's, e.g. linear metrics such a weighted or unweighted average. A CRC check performed at the multi-user receiver 100 can be used as a signal quality metric, e.g. when the transmission format applies a parity check code, typically a CRC, to the information bits before the error control code. Under these conditions, the CRC check at the receiver 100 is a relatively reliable measure of signal reception quality.

In some embodiments, it may be beneficial to establish a threshold for starting the partial decoding process. That is, there may be a minimum percentage of a signal span sufficient for producing a useful reconstructed signal for cancellation. This translates into a minimum percentage of the coded bits that need to be available for decoding. Knowledge of the code rate and the current SNR can be used to determine the partial decoding threshold. Since the coding format of the current received signal is based on a previous SNR estimate, the current SNR estimate can help predict how successful the partial decoding will be. Without knowledge of the current SNR, the partial decoding threshold can be set to a preset value, such that the reconstructed signal is useful to cancel. The partial decoding threshold can be improved when the current SNR is known. If the current SNR is higher than the previous, then the threshold can be lowered, so that partial decoding can start earlier. If the current SNR is lower than the previous, then the threshold can be increased, so that partial decoding can start later. The demodulator metrics can be used in the same way. For instance, the metrics can be averaged among those of relevant symbols in the partial signal span to indicate the effective local noise level. If the noise level is low, partial decoding can be started earlier. If the noise level is high, partial decoding can be started later.

In addition to deciding when to begin partial decoding, a further decision can be made on whether to reconstruct one or more signals for cancellation. In one embodiment, the entire codeword of a signal can be evaluated, e.g., by using $\lambda_{min}$ to make a reconstruction decision. For example, $\lambda_{min}$ can be compared to a pre-set threshold. The $\lambda_{min}$ parameter can also be used in conjunction with the CRC check, whereby both conditions must be satisfied. Alternatively, either condition could be satisfied. In the context of soft reconstruction, signal reconstruction can always be performed if desired because soft reconstruction inherently tends to scale down less reliable signals, thus limiting the potential damage of erroneous cancellation. The CRC check can be used as side information to improve soft reconstruction. In one embodiment, if the CRC fails, the entire soft reconstructed signal is scaled down to indicate a reduced confidence. If the CRC checks, the reconstructed signal can be scaled up to indicate added confidence, resulting in more complete cancellation.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of cancelling interference from a received signal having signal contributions from multiple users, the method comprising:
    partially decoding a first codeword obtained from the received signal and transmitted by a first user via a first signal, wherein set of coded bits corresponding to the partially decoded first codeword being incomplete, wherein the first codeword being decoded even though some of the coded bits are unavailable, and producing hard or soft values for up to all of the coded bits in the first codeword;
    reconstructing the first signal based on the partial decoding of the first codeword;
    cancelling the reconstructed first signal from the received signal to yield a reduced-interference signal; and
    at least partially decoding a second codeword obtained from the reduced-interference signal and transmitted by the first user or a second user via a second signal.

2. The method of claim 1, wherein partially decoding the first codeword comprises:
    treating one or more unavailable coded bits of the first codeword as punctured bits;
    decoding the first codeword based on the one or more punctured coded bits and estimates of the remaining coded bits; and
    producing hard or soft values for available coded bits and up to all of the unavailable coded bits in the codeword.

3. The method of claim 2, wherein treating one or more unavailable coded bits of the first codeword as punctured bits comprises:
    generating coded bit estimates for demodulated samples of the first signal received within a predetermined time window; and
    setting coded bit estimates for samples of the first signal received outside the predetermined time window to a fixed value indicating a punctured bit.

4. The method of claim 3, comprising:
    augmenting deinterleaved coded bit estimates, including the fixed value coded bit estimates indicating a punctured bit, with additional punctured bits as a function of a bit puncturing scheme employed at an encoder of the first user to form a punctured codeword;
    de-interleaving the augmented bit estimates; and
    generating a probability estimate for each coded bit of the punctured codeword, including up to all of the unavailable coded bits.

5. The method of claim 4, wherein reconstructing the first signal based on the partial decoding of the first codeword comprises:

reconstructing one or more soft symbols associated with the first signal based on the probability estimates generated for the coded bits of the punctured codeword; and reconstructing the first signal based on the one or more reconstructed soft symbols.

6. The method of claim 5, wherein each reconstructed soft symbol associated with the first signal spans a plurality of symbols associated with the second signal, the span being a function of the spreading factor, oversampling rate and channel dispersion length associated with the first signal.

7. The method of claim 3, wherein the predetermined time window is a function of the amount of overlap between the first signal and the second signal.

8. The method of claim 3, wherein the predetermined time window spans beyond the end of the second signal, but terminates before the end of the first signal.

9. The method of claim 1, comprising:

subtracting i−1 previously reconstructed signals from the received signal to yield a modified received signal which is substantially free of interference from the i−1 signals;

processing the modified received signal by a receive chain and a signal reconstruction chain associated with an i-th signal to reconstruct the i-th signal; and cancelling the reconstructed i-th signal from the modified received signal to yield a newly modified received signal which is substantially free of interference from the i-th signal.

10. The method of claim 9, comprising ranking the i signals in decreasing order of adjusted power to determine an amount of signal overlap associated with each of the i signals.

11. The method of claim 9, comprising ranking the i signals in increasing order of adjusted coding rate to determine an amount of effective bit puncturing for each of the i signals.

12. The method of claim 1, comprising determining whether a sufficient number of coded bits are available to begin partial decoding of the first codeword based on one or more signal quality metrics.

13. The method of claim 1, comprising determining whether reconstruction and cancellation of the first signal is beneficial for the at least partial decoding of the second signal based on one or more signal quality metrics.

14. The method of claim 1, comprising scaling the reconstructed first signal as a function of whether a cyclic redundancy check value computed for the first signal checks or fails.

15. A wireless receiver, comprising:

a first module operable to partially decode a first codeword obtained from a received signal having signal contributions from multiple users, the first codeword transmitted by a first user via a first signal, wherein set of coded bits corresponding to the partially decoded first codeword being incomplete, wherein the first codeword being decoded and hard or soft values for up to all of the coded bits in the first codeword being produced even though some of the coded bits are unavailable, and reconstruct the first signal based on the partial decoding of the first codeword and cancel the reconstructed first signal from the received signal to yield a reduced-interference signal; and a second module operable to at least partially decode a second codeword obtained from the reduced-interference signal and transmitted by the first user or a second user via a second signal.

16. The wireless receiver of claim 15, wherein the first module is operable to treat one or more unavailable coded bits as punctured bits, decode the first codeword based on the one or more punctured coded bits and estimates of the remaining coded bits, and produce hard or soft values for available coded bits and up to all of the unavailable coded bits in the codeword.

17. The wireless receiver of claim 16, wherein the first module is operable to generate coded bit estimates for demodulated samples of the first signal received within a predetermined time window and set coded bit estimates for samples of the first signal received outside the predetermined time window to a fixed value indicating a punctured bit.

18. The wireless receiver of claim 17, wherein the first module is operable to augment deinterleaved coded bit estimates, including the fixed value coded bit estimates indicating a punctured bit, with additional punctured bits as a function of a bit puncturing scheme employed at an encoder of the first user to form a punctured codeword, de-interleave the augmented bit estimates and generate a probability estimate for each coded bit of the punctured codeword, including up to all of the unavailable coded bits.

19. The wireless receiver of claim 18, wherein the first module is operable to reconstruct one or more soft symbols associated with the first signal based on the probability estimates generated for the coded bits of the punctured codeword and reconstruct the first signal based on the one or more reconstructed soft symbols.

20. The wireless receiver of claim 19, wherein each reconstructed soft symbol associated with the first signal spans a plurality of symbols associated with the second signal, the span being a function of the spreading factor, oversampling rate and channel dispersion length associated with the first signal.

21. The wireless receiver of claim 17, wherein the predetermined time window is a function of the amount of overlap between the first signal and the second signal.

22. The wireless receiver of claim 17, wherein the predetermined time window spans beyond the end of the second signal, but terminates before the end of the first signal.

23. The wireless receiver of claim 15, further comprising an i-th module, wherein i−1 previously reconstructed signals are subtracted from the received signal to yield a modified received signal which is substantially free of interference from the i−1 signals, the i-th module being operable to process the modified received signal to reconstruct the i-th signal and cancel the reconstructed i-th signal from the modified received signal to yield a newly modified received signal which is substantially free of interference from the i-th signal.

24. The wireless receiver of claim 23, wherein the i signals are ranked in decreasing order of adjusted power to determine an amount of signal overlap associated with each of the i signals.

25. The wireless receiver of claim 23, wherein the i signals are ranked in increasing order of adjusted coding rate to determine an amount of effective bit puncturing for each of the i signals.

26. The wireless receiver of claim 15, wherein the first module is operable to determine whether a sufficient number of coded bits are available to begin partial decoding of the first codeword based on one or more signal quality metrics.

27. The wireless receiver of claim 15, wherein the first module is operable to determine whether reconstruction and cancellation of the first signal is beneficial for the at least partial decoding of the second signal based on one or more signal quality metrics.

28. The wireless receiver of claim 15, wherein the first module is operable to scale the reconstructed first signal as a function of whether a cyclic redundancy check value computed for the first signal checks or fails.

* * * * *

UNITED STATES PATENT AND TRADEMARK OFFICE
CERTIFICATE OF CORRECTION

PATENT NO. : 8,406,354 B2
APPLICATION NO. : 12/495954
DATED : March 26, 2013
INVENTOR(S) : Khayrallah et al.

It is certified that error appears in the above-identified patent and that said Letters Patent is hereby corrected as shown below:

On the Title Page, in item (75), under "Inventors", in Column 1, Line 2, delete "Taby (SE)" and insert -- Täby (SE) --, therefor.

In the Specifications:

In Column 4, Line 67, delete "decoder 200" and insert -- decoder 204 --, therefor.

In Column 5, Line 8, delete "decoder 200" and insert -- decoder 204 --, therefor.

In Column 7, Line 56, delete " $2^{M^{(t)}}$ " and insert -- $2^{M^{(1)}}$ --, therefor.

In Column 8, Lines 56-57, delete "second user 302" and insert -- second user 104 --, therefor.

In Column 9, Line 52, delete "r Similar" and insert -- $r^{(i-1)}$. Similar --, therefor.

Signed and Sealed this
Sixteenth Day of July, 2013

Teresa Stanek Rea
*Acting Director of the United States Patent and Trademark Office*